United States Patent [19]

Friedman

[11] Patent Number: 5,354,570
[45] Date of Patent: * Oct. 11, 1994

[54] EXTENDED USE OF FILTER AID IN OIL

[75] Inventor: Bernard Friedman, Allentown, Pa.

[73] Assignee: Oil Process Systems, Inc., Allentown, Pa.

[*] Notice: The portion of the term of this patent subsequent to Apr. 6, 2010 has been disclaimed.

[21] Appl. No.: 995,670

[22] Filed: Dec. 21, 1992

Related U.S. Application Data

[63] Continuation of Ser. No. 794,794, Nov. 19, 1991, Pat. No. 5,200,224, which is a continuation of Ser. No. 518,312, May 7, 1990, abandoned, which is a continuation of Ser. No. 99,134, Sep. 21, 1987, abandoned.

[51] Int. Cl.$^5$ ............... A23L 1/01; C11B 3/04
[52] U.S. Cl. .................. 426/417; 426/438; 426/601; 554/191
[58] Field of Search ........... 426/417, 601, 422, 438; 210/799, 763; 554/191; 260/424, 428; 252/378 R, 190

[56] References Cited

U.S. PATENT DOCUMENTS

| | | | |
|---|---|---|---|
| 2,204,729 | 6/1940 | Montclair | 426/417 |
| 3,346,391 | 10/1967 | Miller et al. | 426/417 |
| 3,900,580 | 8/1975 | Boggs | 426/417 |
| 3,947,602 | 3/1976 | Clewell, Jr. et al. | 426/417 |
| 4,115,597 | 9/1978 | Pellar | 426/417 |
| 4,235,795 | 11/1980 | Cohen | 426/417 |
| 4,330,564 | 5/1982 | Friedman | 426/417 |
| 4,349,451 | 9/1982 | Friedman | 426/417 |
| 4,462,915 | 7/1984 | Friedman | 210/765 |
| 4,491,602 | 1/1985 | Miller | 426/417 |
| 4,681,768 | 7/1987 | Mulfler et al. | 426/417 |
| 4,747,944 | 5/1988 | George | 210/500.1 |

OTHER PUBLICATIONS

Chemical Abstracts, vol. 104, No. 15, Apr. 1986, p. 596, Abstract No. 128658d, Columbus, Ohio.

Primary Examiner—Virginia Manoharan
Attorney, Agent, or Firm—Lerner, David, Littenberg, Krumholz & Mentlik

[57] ABSTRACT

Methods for frying food including supplying cooking fluid to a fryer apparatus, frying food in the cooking fluid so that used cooking fluid including degradation products including surfactants are produced therein and food residue accumulates in the fryer apparatus, adding the treatment compound capable of selectively reducing the amount of the surfactants to the used cooking fluid, and permitting the treatment compound to remain within the fryer apparatus and settle upon the food residue while continuing the food frying process.

9 Claims, 1 Drawing Sheet

U.S. Patent
Oct. 11, 1994
5,354,570
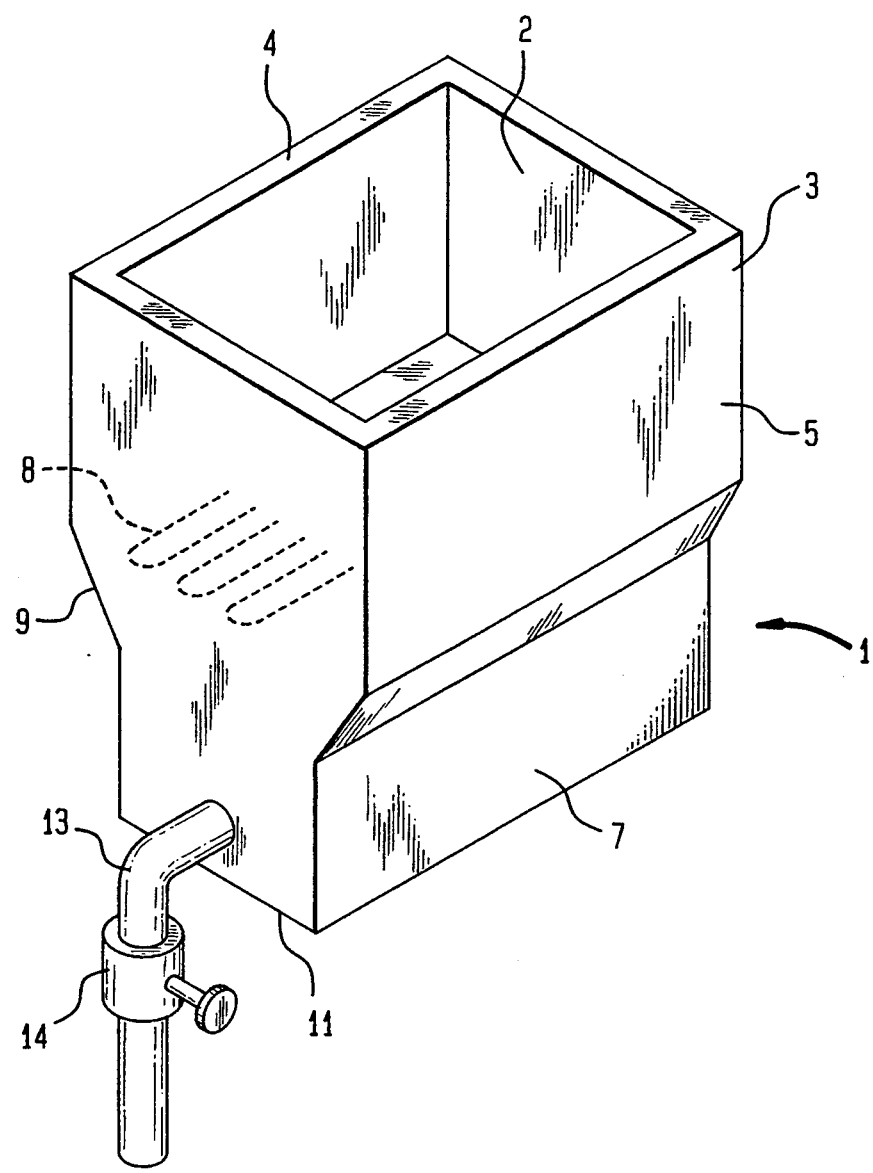

EXTENDED USE OF FILTER AID IN OIL

This is a continuation of application Ser. No. 07/794,794 filed on Nov. 19, 1991, now U.S. Pat. No. 5,200,224, which is a continuation of application Ser. No. 07/518,312, filed on May 7, 1990, abandoned, which is a continuation of application Ser. No. 07/099,134, filed on Sep. 21, 1987, abandoned.

FIELD OF THE INVENTION

The present invention relates to methods for frying foods. More particularly, the present invention relates to methods for controlling the quality of fats and oils during the food frying process. Still more particularly, the present invention relates to methods for controlling the quality of cooking oils generally comprising triglycerides during the food frying process. Still more particularly, the present invention relates to such methods for controlling food frying processes conducted in a batch-type operation.

BACKGROUND OF THE INVENTION

A number of recognized processes exist for both the batch and continuous frying of various foods using cooking or frying oils. In each of these processes there is a recognized tendency for the oils which are used to decompose, forming various chemical products therefrom. These chemical products include free fatty acids, along with other impurities and contaminants, including food residue or "crumb" produced during this process itself, along with the products formed by the breakdown of the oils used and the interaction of the oils with food products added thereto. It is also known that in all of these processes the presence of these materials in the cooking oil, as well as the degradation of the oil itself, eventually results in degradation of the frying properties of the oil, until the oil is no longer useful.

A highly successful approach to the problems of the degradation of cooking oils, and the consequent poor cooking products produced thereby, is set forth in U.S. Pat. No. 4,330,564 to Friedman. This patent discloses a fryer oil treatment utilizing expanded rhyolitic material and water, in amounts of from about 33 to 75 wt. % of the composition, for such treatment processes. This material is preferably used in combination with a food-compatible acid, and the particular process to which this patent is directed employs a system in which once treatment is completed the residue of the composition of that invention is removed from the treated oil by means well known in the art for this purpose, i.e. filtering. The oil is thus preferably filtered hot, and with a hand filter or a filter machine, and the cooking process is then permitted to continue. This patent thus discloses that in typical operations used cooking oil can be treated after each frying meal or at the end of each frying day. Filters useful in these inventions are also set forth in this patent, and include as a preferred filter one described in U.S. Pat. No. 4,052,319.

This material has thus become highly significant in a commercial sense in connection with various batch-type processes which are generally used in the retail food industry in areas where used fryer cooking oil is mixed with the composition, including the porous carrier material, and the residue then filtered from the oil. The presence of the water in these compositions results in dispersion of the porous carrier material throughout the hot oil.

The use of these food-compatible acids was previously disclosed in Clewell, Jr. et al, U.S. Pat. No. 3,947,602, disclosing the use of various absorbents, such as diatomaceous earth, activated carbon and the like, to remove contaminants from the used cooking oil, again in a process where filtration is employed in connection with the used oil.

In co-pending U.S. patent application No. 035,071, filed on Apr. 6, 1987, assigned to the assignee of the present application, a continuous treatment process is disclosed in which the oil is continuously recirculated through a cooking zone in the recirculation zone, and the recirculating oil is continuously treated with these treatment compounds, which are capable of selectively reducing the content of surfactants produced from the use of the cooking oil to substantially increase the useful life of the oil in this process. Once again in these processes, as shown in the drawings in this pending patent application, the treatment procedure includes a filtering medium, upon which the treatment material is deposited as it contacts the used oil, and from which it is then removed.

The search has therefore continued for methods for improving the food frying processes, particularly in batch-type operations.

SUMMARY OF THE INVENTION

In accordance with the present invention, these and other objects have now been realized by the applicant's discovery of a method for frying food comprising providing a supply of cooking fluid or fryer cooking oil in a fryer apparatus, frying food in the supply of cooking fluid so that used cooking fluid, including degradation products including surfactants, are produced therein and food residue accumulates in the fryer apparatus, adding a treatment compound capable of selectively reducing the amount of the surfactants in the used cooking oil, and permitting the treatment compound to remain within the fryer apparatus and settle upon the food residue therein while continuing the food frying process.

In accordance with one embodiment of the method of the present invention, the method includes intermittently adding the treatment compound to the used cooking fluid while continuing the food frying process. In a preferred embodiment, the method includes removing the used cooking fluid, the food residue and the treatment compound from the frying apparatus at the termination of food frying process. In a more preferred embodiment, the method also includes separating the used cooking fluid from the food residue and the treatment compound, and returning the used cooking fluid to the frying apparatus for continuing the food frying process.

In accordance with another embodiment of the method of the present invention, the treatment compound is capable of selectively adsorbing or absorbing surfactants thereonto, and preferably the treatment compound comprises a treatment powder.

In accordance with another embodiment of the method of the present invention, the treatment compound comprises a porous rhyolitic material, and preferably one including between about 33 and 75 wt. % water. In a preferred embodiment, the treatment compound includes a food compatible acid, preferably citric acid.

In accordance with another embodiment of the present invention, the method includes heating the cooking fluid within the fryer apparatus at a predetermined location within the fryer apparatus, whereby the food residue accumulates at a location in the fryer apparatus below that predetermined location.

BRIEF DESCRIPTION OF THE DRAWING

The following detailed description of the present invention can be more fully appreciated with reference to the Figure, in which:

FIG. 1 is a front, elevational, prospective drawing of a fryer apparatus used in accordance with the method of the present invention.

DETAILED DESCRIPTION

The treatment compound which is disclosed in U.S. Pat. No. 4,330,564 and which comprises water, food-compatible acid and porous rhyolite or perlite carrier, is disclosed for use in direct contact with used hot cooking oil. It is thus stated in this patent that this composition removes or neutralizes the effect of certain undesirable impurities from the used cooking oil, such as soluble food juices and fatty acids which have an adverse effect on the cooking oil, particularly with respect to its useful lifetime and cooking characteristics. This patent also discloses that these compositions provide easy filtration once treatment has been completed, and that in fact there is no absolute need for the filter cake or filter machine with the composition of the invention, but rather a simple hand filtration is all that is required. This patent strictly discloses and claims, however, that upon filtration the treated oil can then be used for further cooking.

In accordance with the present invention, however, it has now been discovered that these types of treatment compositions, which have now been found (as disclosed in co-pending U.S. patent Ser. No. 035,071, filed on Apr. 6, 1987) to reduce the presence of akaline contaminant materials (ACM's) in these systems and, in particular, to reduce the surfactant content of these cooking fluids or oils. This prior application thus included a recognition that there is continuous build-up of these ACM's in these systems, and that the use of this composition to contact the used cooking oil for short periods of time can reverse this process. The application of this principle to batch-type systems is the subject of the present application. More particularly, in accordance with this method it has now been found that the use of filtration can be severely limited, and in fact in many cases eliminated entirely, by adding the treatment compound itself directly to the cooking apparatus in question and permitting it to remain therein, and that this can be done with a number of positive effects, and rather unexpectedly with no significant negative effects. Thus, apart from achieving its initial effect of reducing the presence of these ACM's, and in particular reducing the content of the surfactants generated in the used oil so as to substantially increase the life of that oil, it has also now been quite unexpectedly found that the continued presence of the treatment compound in the cooking oil environment during further frying in the oil not only does not produce any negative side effects, but creates additional positive factors in the overall cooking process.

More particularly, during the frying process various food residues, sediments and "crumb" products are produced in the oil, and these tend to settle out into the bottom of the fryer apparatus. The continued presence of this food residue in the apparatus, however, can have a negative impact on the overall frying process, and upon the life of the oil. The sediment or crumb material can continue to circulate throughout the oil bath, thus continuing to have a negative impact on the various properties of the oil, as well as depositing on food therein. By employing the present process, however, and by thus applying the above-mentioned treatment compounds directly to the fryer bath, this negative impact is alleviated by the physical presence of the treatment compound on top of the food residue or crumb sediment at the bottom of the fryer apparatus. This in itself further contributes to the life of the oil during the cooking process.

Furthermore, by employing the present method and leaving the treatment compound within the oil bath during continued food processing or frying, the residual activity of the treatment compound itself is fully utilized. Thus, the essential characteristic of this treatment compound in terms of preventing build-up of deposits on the inside of fryer pots, and the consequent establishment of a cleaner and more efficient frying process, the provision of oleophobic properties with food thus allowing the production of fried food products therein without the oily residue previously found on such products, diminishing the effect of certain colored materials from used cooking oils, the possible removal of toxic materials therefrom, and the overall increase of the life of the cooking oil used therein, is accomplished to a maximum degree by retention of the treatment compound within the oil during the extended food frying process.

It has also unexpectedly been found that the presence of this treatment compound, which is preferably in the form of a treatment powder, does not have an adverse effect on the food product which is produced therein. This is contrary to what one of ordinary skill in this art would have expected. It would thus have been expected that the presence of this powder material within the cooking oil would result in the undesirable deposition of a sandy powder or "grit" on the surface of the food, but in fact this is found not to be the case. Not wishing to be bound by any particular theory of the mechanism with which this is avoided, it is believed that the treatment compound not only primarily Mettles to the bottom of the frying apparatus, but that in addition any floating or suspended particles of the treatment compound contained within the bath are propelled away from the frying food by water and other food juices which are purged from the food during heating within the frying oil. In addition, residual fines floating at the surface of the oil are moved by the effects of surface tension to the meniscus of the oil at the fryer's walls and adhere thereto out of the active frying system.

This benefit of utilizing the method of the present invention is more fully realized if it is conducted intermittently throughout the entire food frying process until that process is terminated on a batch basis. Thus, upon each additional supply of treatment compound to the used cooking oil further advantage is taken of the settlement of the treatment compound or powder upon the food residue or crumb material at the bottom of the fryer apparatus, thus further preventing these food residues from rising in the oil due to agitation or convective forces within the oil.

The overall effect of this process is to thus reduce the need for frequency of filtering, or in fact to eliminate filtering altogether, so that one can simply discard the oil when it has been exhausted, and at the same time realize all of the other beneficial effects of these treatment compounds as previously described.

Turning to the Figure, a typical batch fryer vat 1 is shown therein. Such a vat includes an upper useful cooking area 3, which is generally rectangular in configuration which includes an upper opening 2, defined by rectangular rim 4. The cooking area extends downwardly to a lower portion 5, at which level within the vat heating coils 8 are generally maintained, which are not actually shown in the Figure, but are represented by the dotted lines in the Figure. The vat itself, however, continues downwardly from that level into a cold well area 7, which is generally connected by tapered wall portions 9 to the lower portion 5 of the vat 1, and which terminate in bottom or base 11 extending therealong. The entire vat 1 can then be filled with cooking fluid or oil, including both the cold well portion 7 and the main cooking portion 3, and by activation of the heating coil 8 the oil can be brought to cooking temperature, so that food can enter through the upper opening 2 and be placed into the cooking oil, generally being maintained in that position by a basket or screen which is mounted on the rim 4 while the food is cooked within the oil bath.

A drain or spigot 13 generally extends from the cold well 7 near the base 11, and the spigot 3 includes a valve 14, so that when desired the oil, along with food residue and other materials within the fryer vat, can be removed therefrom.

During the food processing itself food residue which breaks off from the food within the basket mounted within the fryer vat 1 will generally fall downwardly into the cold well 7 and be retained therein, while pieces of the residue or crumb material can circulate within the bath during further use. In accordance with the present method, however, after removal of the food basket, the treatment compound of the present invention can be added directly into the oil through the opening 2 to contact the used and heated oil within the bath. It can thus accomplish its primary purpose of improving the quality of the oil and reducing the ACM's and surfactants therein, and then settle downwardly to cover the food residue or crumb material at the bottom of the cold well 7 along the bottom wall 11 thereof. This process can be repeated intermittently throughout the cooking process, that is as additional batches of food are fried in the oil by being placed in the upper portion 3 thereof, by the addition of further amounts of treatment compound after predetermined periods of use. In each such case the presence of the treatment compound will further inhibit the recirculation of additional food residue which has gathered along the bottom wall 11 of the fryer vat itself.

It is generally preferred that there be a cold well 7 below the heater coils or other heating apparatus within the oil. It is preferred that there thus be some distance between the bottom wall 11 and the heating coils to permit the build-up of food residue, and in accordance with the present invention the application of treatment compound thereon. It is thus not desirable that this entire space be taken up by these solid materials so that they eventually come into direct contact with the heating coils. Thus in those systems without a cold well, or with a small distance between the bottom wall 11 and the heating coil 8, it would be desirable to drain the fryer vat more frequently. The reason for this is that contact with the solid material or overlying of the crumb and/or treatment powder can result in burning out the heaters themselves, or in any event promote the formation of pyrolysis products within the sediment, which can be harmful. After this predetermined period of time, the vat 1 can thus be drained through the spigot 13 and valve 14 (if available), so that the used oil along with the food residue or crumb material and the used treatment powder exits from the fryer vat. This material can be collected, and either by centrifugation, filtration or other means, the used oil can be separated from the solids therein, which can then be discarded. The used oil can then be returned to the fryer vat 1 for further service. In this manner, the longer life of the oil as accomplished by using the treatment compounds of this invention is fully taken advantage of without the need for constant or immediate filtering, and again in many cases with a complete elimination of the filtering process itself i.e., without filtering the cooking oil. The consequence of considerable savings in time and labor which result from use of this method can be a significant advantage to the user.

As for the treatment compound itself, this is a material which is capable of selectively but not necessarily exclusively reducing the ACM or surfactant content of the oil, and in most preferred form is presently an active filter aid designated LIFE, which comprises a non-alkaline, non-dusting, non-irritating powder material which is designed to remove or control the surfactants formed during use of drying oils. It is believed that this powder material slows the degradation of heated oils by slowing down the hydrolysis and rate of oxidation of the oil along with the subsequent development of surfactant and/or precursors species therein.

The LIFE (or otherwise branded) powder material itself consists of an expanded, rhyolitic, obsidian perlite material with an amorphous silicate structure. Furthermore, the powder compositions employed herein comprise the porous rhyolite carrier and water, and preferably sufficient water so that when contacted with hot fats and oils above the boiling point of water the water steams and disperses the composition throughout the oil. Thus, the composition preferably contains from about 33 to about 75 wt. % water. In a preferred embodiment the composition comprises the porous carrier, water, and a food compatible acid, such as citric acid, tartaric acid, acetic acid, phosphoric acid, malic acid and mixtures thereof, with the preferred food compatible acid being citric acid. The overall composition preferably contains between about 2 and 10 wt. % of the food compatible acid, and more preferably between about 4 and 6 wt. % thereof.

The rhyolitic materials themselves are rendered "expanded" or porous by methods well known in the art, such as by heat expansion. Thus, these rhyolitic materials are initially heated to remove substantially all of the free moisture content, and the dried material is then directed to a "popper" where it is exposed to the flame of a gas jet at temperatures generally in the range of about 1480° C. The rhyolite material is then allowed to expand to produce the porous rhyolite carrier material used in this invention, which generally has a low density and a spherical shape. Preferably, the material has sizes in the ranges of from about 8 to about 120 mesh, more preferably from about 20 to about 80 mesh, and most preferably from about 40 to about 60 mesh. The porous spheres act as carriers both for the water and, when used, the food compatible acid such as the citric acid into the hot fryer oil. An average analysis of this inorganic material, which is of a variable composition due to its natural formation, includes a compositional analysis on a percentage basis as follows:

| | |
|---|---|
| Silica | 75.62% |
| Alumina | 12.02 |
| Ferric oxide | 2.36 |
| Calcium oxide | 0.83 |
| Magnesium oxide | 0.40 |
| Sodium oxide | 1.56 |
| Potassium oxide | 6.10 |
| Loss on Ignition | 0.91 |

There are a considerable number of other treatment powders which are being employed as filter aide in this industry. These include diatomaceous earth, which primarily comprises a silica powder material, and which is obtainable from various sources; a zeolitic and absorbent mineral base, FRYLIGHT, a product of Kaiser Aluminum Co.; a calcium and magnesium hydroxide material fused with diatomaceous earth, which is sold under the name MICROSWEET, a product of Manville Corporation; and a magnesium silicate material sold under the name MAGNESOL, a product of Reagent Chemical Research Inc. As has been discovered by applicants, however, from among these materials only the above-deScribed rhyolitic material can successfully selectively reduce the ACM or surfactant content of the oil to substantively low amounts when used in accordance with the method of the present invention, and thus achieve the unexpected superior results hereof.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:

1. A method of frying food comprising providing a supply of cooking oil for use in a food frying process in a fryer apparatus, frying said food in said supply of cooking oil whereby said cooking oil including degradation products comprising surfactants are produced therein and food residue accumulates in said fryer apparatus, adding a treatment compound, directly in said cooking oil, said treatment compound reducing the amount of said surfactants to said used cooking oil, permitting said treatment compound to remain within said fryer apparatus and settle upon said food residue while continuing said food frying process, intermittently adding additional amounts of said treatment compound to said used cooking oil while further continuing said food frying process, and carrying out said method without filtering said cooking oil.

2. The method of claim 1 wherein said treatment compound is capable of selectively absorbing said surfactants thereonto.

3. The method of claim 14 wherein said treatment compound is capable of selectively adsorbing said surfactants thereonto.

4. The method of claim 2 or 3 wherein said treatment compound is a treatment powder.

5. The method of claim 4 wherein said treatment compound includes a food-compatible acid.

6. The method of claim 5 wherein said food-compatible acid comprises citric acid.

7. The method of claim 1 wherein said treatment compound comprises a porous rhyolitic material.

8. The method of claim 7 wherein said porous rhyolitic material includes between about 33 and 75 wt. % water.

9. The method of claim 1 including heating said cooking oil in said fryer apparatus at a predetermined location within said fryer apparatus whereby said food residue accumulates at a location in said fryer apparatus below said predetermined location.

* * * * *